(12) United States Patent (10) Patent No.: US 12,040,477 B2
Chen et al. (45) Date of Patent: Jul. 16, 2024

(54) 3-D COMPOSITE ANODES FOR LI-ION BATTERIES WITH HIGH CAPACITY AND FAST CHARGING CAPABILITY

(71) Applicant: The Regents of the University of Michigan, Ann Arbor, MI (US)

(72) Inventors: Kuan-Hung Chen, Ann Arbor, MI (US); Neil Dasgupta, Ann Arbor, MI (US); Jeffrey Sakamoto, Ann Arbor, MI (US); Min Ji Namkoong, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/121,525

(22) Filed: Mar. 14, 2023

(65) Prior Publication Data

US 2023/0282804 A1 Sep. 7, 2023

Related U.S. Application Data

(63) Continuation of application No. 16/899,562, filed on Jun. 11, 2020, now Pat. No. 11,626,583.

(60) Provisional application No. 62/860,176, filed on Jun. 11, 2019.

(51) Int. Cl.
*H01M 4/133* (2010.01)
*H01M 10/0525* (2010.01)
*H01M 50/46* (2021.01)
*H01M 4/02* (2006.01)

(52) U.S. Cl.
CPC ....... *H01M 4/133* (2013.01); *H01M 10/0525* (2013.01); *H01M 50/46* (2021.01); *H01M 2004/021* (2013.01); *H01M 2004/027* (2013.01)

(58) Field of Classification Search
None
See application file for complete search history.

(56) References Cited

U.S. PATENT DOCUMENTS

| 9,040,182 B2 | 5/2015 | Aihara et al. |
| 10,147,950 B2* | 12/2018 | Sakshaug .............. H01M 4/134 |
| 2009/0029257 A1 | 1/2009 | Ando et al. |
| 2009/0148759 A1 | 6/2009 | Mitsuda et al. |

(Continued)

FOREIGN PATENT DOCUMENTS

| JP | 2008300102 A | 12/2008 |
| KR | 20160104491 A | 9/2016 |

OTHER PUBLICATIONS

Product Data Sheet for TIMREX SFg6 graphite particles obtained from the internet on Sep. 4, 2023. (Year: 2023).*

(Continued)

*Primary Examiner* — Wyatt P McConnell
(74) *Attorney, Agent, or Firm* — Reising Ethington P.C.

(57) ABSTRACT

A lithium-ion battery includes an electrode with a plurality of channels formed at least partially through its thickness. Each channel has a diameter in a range from 5 μm to 100 μm and/or is spaced apart from another channel by a distance in a range from 10 μm to 200 μm as measured between centerlines of the channels. The electrode may be an anode and includes carbonaceous material such as graphite and/or additional electrochemically active lithium host materials. The battery can be charged at a C-rate greater than 2 C.

14 Claims, 5 Drawing Sheets

(56) References Cited

U.S. PATENT DOCUMENTS

2012/0276421 A1 11/2012 Aihara et al.
2018/0190975 A1 7/2018 Ishii et al.

OTHER PUBLICATIONS

R. Schmuch et al., "Performance and cost of materials for lithium-based rechargeable automotive batteries", Nat. Energy. 3 (2018) pp. 267-278.
Y. Nishi, "The Dawn of Lithium-Ion Batteries", Electrochem. Soc. Interface. 25 (2016) pp. 71-74.
S. Ahmed et al., "Enabling fast charging—A battery technology gap assessment", J. Power Sources. 367 (2017) pp. 250-262.
K.G. Gallagher et al., "Optimizing Areal Capacities through Understanding the Limitations of Lithium-Ion Electrodes", J. Electrochem. Soc. 163 (2016) pp. A138-A149.
J. Billaud et al., "Magnetically aligned graphite electrodes for high-rate performance Li-ion batteries", Nat. Energy. 1 (2016) pp. 1-6.
Y. Kim et al., "Improving Li-ion battery charge rate acceptance through highly ordered hierarchical electrode design", Ionics (Kiel). 24 (2018) pp. 2935-2943.
L. Li et al., "Fabrication of Low-Tortuosity Ultrahigh-Area-Capacity Battery Electrodes through Magnetic Alignment of Emulsion-Based Slurries", Adv. Energy Mater., 9, 1802472 (2019), 7 pages.
V.P. Nemani et al., "Design of Bi-Tortuous, Anisotropic Graphite Anodes for Fast Ion-Transport in Li-Ion Batteries", J. Electrochem. Soc. 162 (2015) pp. A1415-A1423.
M.F. Lagadec et al., "Characterization and performance evaluation of lithium-ion battery separators", Nat. Energy. 4 (2019) pp. 16-25.
C. Heubner et al., "Diffusion-Limited C-Rate: A Fundamental Principle Quantifying the Intrinsic Limits of Li-Ion Batteries", Adv. Energy Mater., 10, 1902523 (2020), 7 pages.
D.H. Kim et al., "Toward Fast Operation of Lithium Batteries: Ion Activity as the Factor to Determine the Concentration Polarization", ACS Energy Lett. 4 (2019) pp. 1265-1270.
T. Waldmann et al., "Li Plating as Unwanted Side Reaction in Commercial Li-ion Cells—A Review", J. Power Sources. 384 (2018) pp. 107-124.
A.M. Colclasure et al., "Requirements for Enabling Extreme Fast Charging of High Energy Density Li-ion Cells While Avoiding Lithium Plating", J. Electrochem. Soc. 166 (2019) pp. A1412-A1424.
V. Srinivasan et al., "X-CEL: extreme Fast Charge Cell Evaluation of Lithium-ion Batteries", (2019), 42 pages.
J.S. Sakamoto et al., "Hierarchical Battery Electrodes Based on Inverted Opal Structures", J. Mater. Chem. 12 (2002) pp. 2859-2861.
C.J. Bae et al., "Design of Battery Electrodes with Dual-Scale Porosity to Minimize Tortuosity and Maximize Performance", Adv. Mater. 25 (2013) pp. 1254-1258.
J.S. Sander et al., "High-Performance Battery Electrodes via Magnetic Templating", Nat. Energy. 1 (2016) pp. 1-7.
J.B. Habedank et al., "Enhanced Fast Charging and Reduced Lithium-Plating by Laser-Structured Anodes for Lithium-Ion Batteries", J. Electrochem. Soc. 166 (2019) pp. A3940-A3949.
W. Pfleging, "A Review of Laser Electrode Processing for Development and Manufacturing of Lithium-Ion Batteries", Nanophotonics 7 (2018) pp. 549-573.
N. Kim et al., "Fast-Charging High-Energy Lithium-Ion Batteries via Implantation of Amorphous Silicon Nanolayer in Edge-Plane Activated Graphite Anodes", Nat. Commun. 8 (2017) pp. 1-10.
D. Lee et al., "High Speed Remote Laser Cutting of Electrodes for Lithium-Ion Batteries: Anode", J. Power Sources. 240 (2013) pp. 368-380.
D. Lee et al., "Parameter Optimization for High Speed Remote Laser Cutting of Electrodes for Lithium-Ion Batteries", J. Laser Appl. 28 (2016) pp. 022006-11.
J.B. Habedank et al., "Increasing the Discharge Rate Capability of Lithium-Ion Cells with Laser-Structured Graphite Anodes: Modeling and Simulation", J. Electrochem. Soc. 165 (2018) pp. A1563-A1573.
L. Kraft et al., "Modeling and Simulation of Pore Morphology Modifications using Laser-Structured Graphite Anodes in Lithium-Ion Batteries", J. Electrochem. Soc. 167 013506 (2020) 13 pages.
C. Mao et al., "Selecting the Best Graphite for Long-Life, High-Energy Li-Ion Batteries", J. Electrochem. Soc. 165 (2018) pp. A1837-A1845.
A. Lutey et al., "Pulsed Laser Ablation of Lithium Ion Battery Electrodes", Proceedings of the ASME 2014 International Manufacturing Science and Engineering Conference (2014), 7 pages.
C. Ge et al., "Novel Hard Carbon/Graphite Composites Synthesized by a Facile in Situ Anchoring Method as High-Performance Anodes for Lithium-Ion Batteries", RSC Advances 8 (2018) pp. 34682-34689.
Y. G. Lim et al., "Hard Carbon-Coated Natural Graphite Electrodes for High-Energy and Power Lithium-Ion Capacitors", Bull. Korean Chem. Soc. 36 (2015) pp. 150-155.
K. J. Kim et al., "A Hard Carbon/Microcrystalline Graphite/Carbon Composite with a Core-Shell Structure as Novel Anode Materials for Lithium-Ion Batteries", Electrochimica Acta 135 (2014) pp. 27-34.
J. Zhang et al., "Composite of Mesocarbon Microbeads/Hard Carbon as Anode Material for Lithium Ion Capacitor with High Electrochemical Performance", J. Electroanal. Chem. 747 (2015) 20-28.
M. Ebner et al., "Tortuosity Anisotropy in Lithium-Ion Battery Electrodes", Adv. Energy Mater., 4, 1301278 (2014), 6 pages.
K. Kubota et al., "Structural Analysis of Sucrose-Derived Hard Carbon and Correlation with the Electrochemical Properties for Lithium, Sodium, and Potassium Intertion", Chem. Mater. 32 (2020) pp. 2961-2977.
H. Fujimoto et al., "Li Nuclear Magnetic Resonance Studies of Hard Carbon and Graphite/Hard Carbon Hybrid Anode for Li Ion Battery", J. Power Sources 196 (2011) pp. 1365-1370.
J.B. Habedank et al., "Femtosecond laser structuring of graphite anodes for improved lithium-ion batteries: Ablation characteristics and process design", Journal of Laser Applications, 30(3), 032205 (2018), 8 pages.
W. Pfleging et al., "Laser generated microstructures in tape cast electrodes for rapid electrolyte wetting: new technical approach for cost efficient battery manufacturing", Proc. of SPIE vol. 8968 (2014), 9 pages.
J. Pröll et al., "Laser-printing and femtosecond-laser structuring of LiMn2O4 composite cathodes for Li-ion microbatteries", Journal of Power Sources, 255 (2014), pp. 116-124.
K. Yanagida et al., "Carbon Hybrids Graphite-Hard Carbon and Graphite-Coke as Negative Electrode Materials for Lithium Secondary Batteries Charge/Discharge Characteristics", J. Electrochem. Soc. 149, 2002, A804, 5 pages.
International Search Report corresponding to International Application No. PCT/US2020/037331, dated Sep. 24, 2020, 3 pages.
Written Opinion corresponding to International Application No. PCT/US2020/037331, dated Sep. 24, 2020, 7 pages.
Extended European Search Report corresponding to application 20823683.6, dated Nov. 22, 2023, 9 pages.

\* cited by examiner

Gr/HC 75/25

Gr/HC 75/25

Gr/HC 50/50

Gr/HC 50/50

Graphite

Graphite

Hard Carbon

Hard Carbon

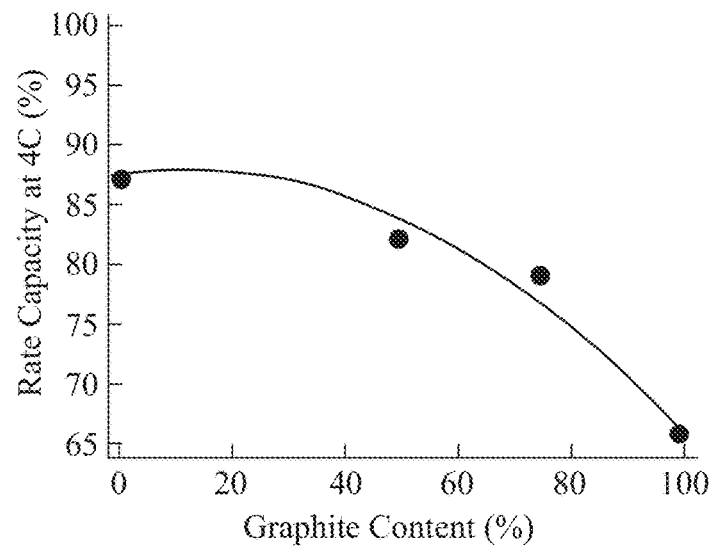
FIG. 11
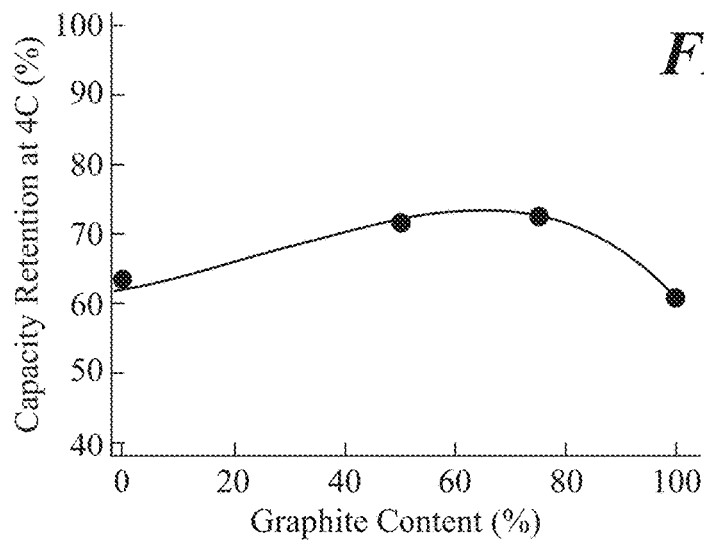
FIG. 12
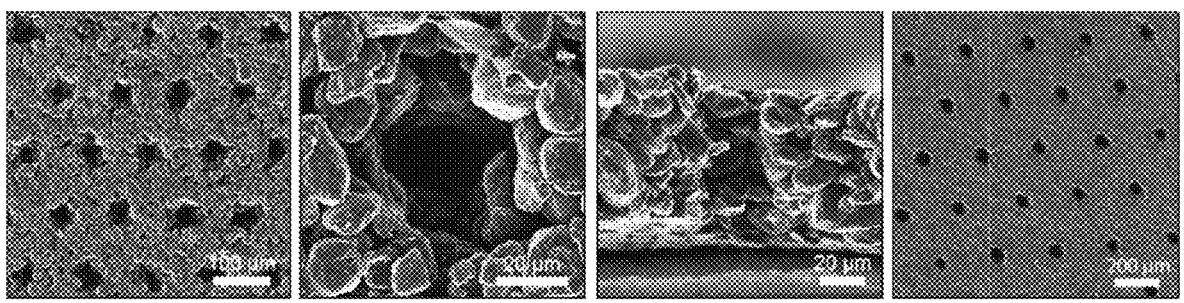
*FIG. 13*   *FIG. 14*   *FIG. 15*   *FIG. 16*

3-D COMPOSITE ANODES FOR LI-ION BATTERIES WITH HIGH CAPACITY AND FAST CHARGING CAPABILITY

STATEMENT OF FEDERALLY-SPONSORED RESEARCH

This invention was made with government support under DE-EE0008362 awarded by the United States Department of Energy. The government has certain rights in the invention.

TECHNICAL FIELD

The present disclosure relates generally to lithium-ion batteries, and more particularly, to a 3-D composite anode that exhibits high capacity and high rate capability.

BACKGROUND

Batteries with higher energy density and power density are essential for many applications including electric vehicles, grid storage, and portable electronics. Over the past few decades, lithium ion (Li-ion) batteries have proven to be the most popular choice for consumer electronics, primarily because of their high specific energy and energy density. At present, graphite is the most popular anode material for Li-ion batteries due to its relatively high capacity and excellent cycling lifetime. However, the rate performance of graphite may limit its application in high-power systems. Additionally, Li-ion battery anodes tend to be highly optimized for performance at a relatively slow charging operation, and even if they are not, significant challenges are still present for fast charging conditions (e.g., >a C-rate of 4 C or less than 15-minute charge time). These challenges include large kinetic polarizations, concentration gradients, heat generation, and lithium (Li) metal plating on the graphite surface.

In state-of-the-art Li-ion batteries with high energy densities, the electrodes are relatively thick (>80 µm), which intrinsically leads to a tradeoff between energy density and high-power performance. This is because thicker electrodes introduce increasingly tortuous pathways for Li-ion transport through the electrode thickness, resulting in increasing electrolyte concentration gradients during cycling. The large concentration gradient during fast charging leads to large cell polarization, which causes cells to reach cut-off voltages prior to the targeted state of charge. As a result, reduced accessible capacity of the battery is often observed during high-rate cycling. The electrochemical potential of the graphite anode can also become more negative than the thermodynamic potential for Li plating during fast charge, resulting in the onset of non-uniform Li deposition. The formation of metallic Li (usually in the form of dendritic structures) on graphite anodes not only results in low cycling efficiencies, but also causes irreversible capacity fade, leading to the eventual cell failure.

Compared to graphite, non-graphitizable carbon materials such as hard carbon tend to have a more homogeneous Li intercalation flux and, thus, may display an improved rate capability. The improved Li intercalation flux is attributed to the crystallographic structure and particle size of the hard carbon material, leading to improved intercalation kinetics and solid-state Li diffusivity. However, hard carbon materials often suffer from low initial Coulombic efficiencies, indicating a significant initial irreversible capacity loss. This drawback significantly limits the overall capacity and energy density of the battery. Therefore, to simultaneously achieve fast charging and maintain energy density of Li-ion batteries, new approaches are required to address Li ionic transport limitations through thick electrodes.

SUMMARY OF THE DISCLOSURE

According to one aspect of the disclosure, a lithium-ion battery includes a pair of electrodes and a separator that physically separates and electrically isolates the electrodes from each other and allows lithium ions to pass between the electrodes in the presence of an electrolyte. At least one of the electrodes includes a first major face, a second major face, and an electrochemically active lithium host material distributed between the first and second major faces of the electrode. The first and second major faces define a thickness of the electrode. The electrode defines a plurality of channels extending at least partially through the thickness of the electrode, and a width of each of the channels is in a range from 5 µm to 100 µm.

According to another aspect of the disclosure, a lithium-ion battery includes a pair of electrodes and a separator that physically separates and electrically isolates the electrodes from each other and allows lithium ions to pass between the electrodes in the presence of an electrolyte. At least one of the electrodes includes a first major face, a second major face, and an electrochemically active lithium host material distributed between the first and second major faces of the electrode. The first and second major faces define a thickness of the electrode. The electrode defines a plurality of channels extending at least partially through the thickness of the electrode, and each channel is spaced apart from another channel by a distance in a range from 10 µm to 200 µm as measured between centerlines of the channels.

According to another aspect of the disclosure, a lithium-ion battery includes a pair of electrodes and a separator that physically separates and electrically isolates the electrodes from each other and allows lithium ions to pass between the electrodes in the presence of an electrolyte. At least one of the electrodes includes a first major face, a second major face, and at least two electrochemically active lithium host materials distributed between the first and second major faces of the electrode. The first and second major faces define a thickness of the electrode. At least one of the electrochemically active lithium host materials is a carbonaceous material, and the electrode defines a plurality of channels extending at least partially through the thickness of the electrode. A width of each of the channels is in a range from 5 µm to 100 µm, or each channel is spaced apart from another channel by a distance in a range from 10 µm to 200 µm as measured between centerlines of the channels.

According to various embodiments, the lithium-ion battery may further include any one of the following features or any technically feasible combination of some or all of these features:

- the electrochemically active lithium host material is carbonaceous;
- the electrochemically active lithium host material includes graphite or hard carbon in a range from 20 wt % to 80 wt %;
- the electrochemically active lithium host material comprises a blend of graphite and at least one other electrochemically active lithium host material;
- the electrochemically active lithium host material comprises graphite having a purity of 99% or greater and comprises graphite particles that exhibit an ellipsoidal shape and/or have a particle size distribution in which at least 90% of the graphite particles have a particle size ranging from 5-25 µm;

each channel is spaced apart from another channel by a distance in a range from 10 µm to 200 µm as measured between centerlines of the channels;

the first major face confronts the separator and at least one of the channels tapers inward toward the second major face of the electrode;

the first major face confronts the separator and each channel is open at the first major face;

the plurality of channels is laser-patterned;

the pair of electrodes includes an anode and a cathode, and the at least one of the electrodes is the anode.

DRAWINGS

Example embodiments will hereinafter be described in conjunction with the appended drawings, wherein like designations denote like elements, and wherein:

FIG. 11 is a plot of rate performance at a charge rate of 4 C versus graphite content in the anode for several anode examples including two of which were anodes that contained a blend of graphite and hard carbon in accordance with one embodiment of the present disclosure;

FIG. 12 is a plot of capacity retention at a charge rate of 4 C versus graphite content in the anode for several anode examples including two of which were anodes that contained a blend of graphite and hard carbon in accordance with one embodiment of the present disclosure;

FIGS. 13-16 show SEM images of patterned anodes at different magnifications after laser ablation was employed to form vertical channels within the anodes in accordance with one embodiment of the present disclosure;

Figure 17:
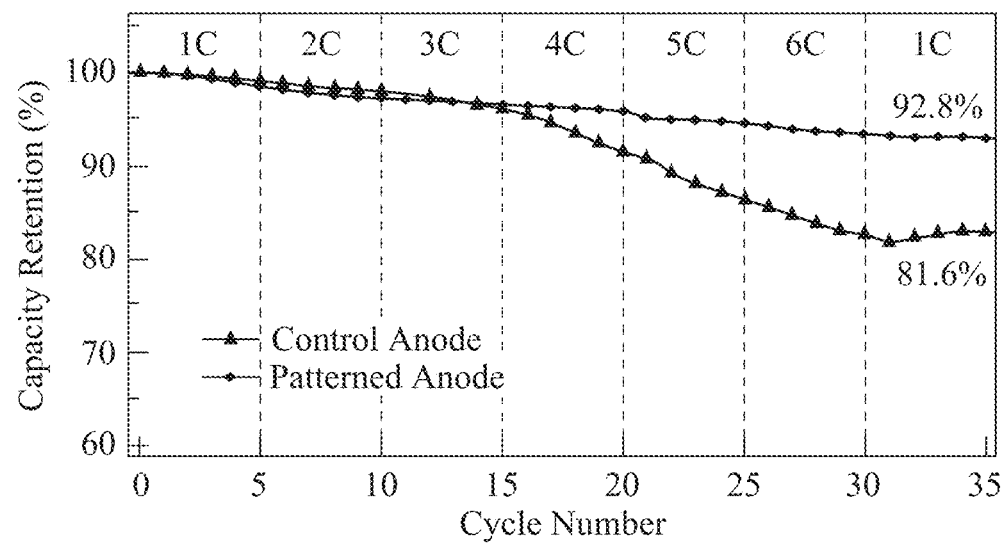
Figure 18:
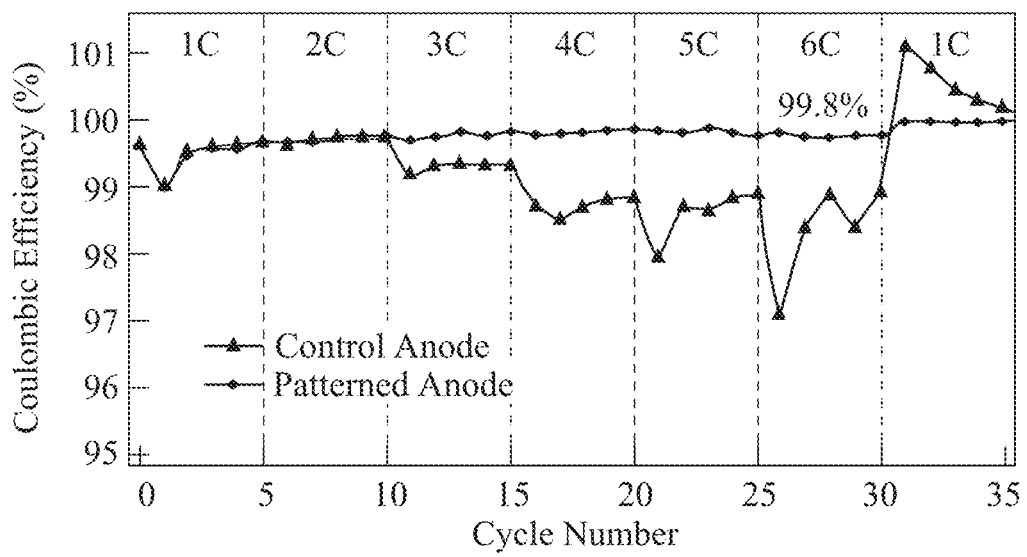
Figure 19:
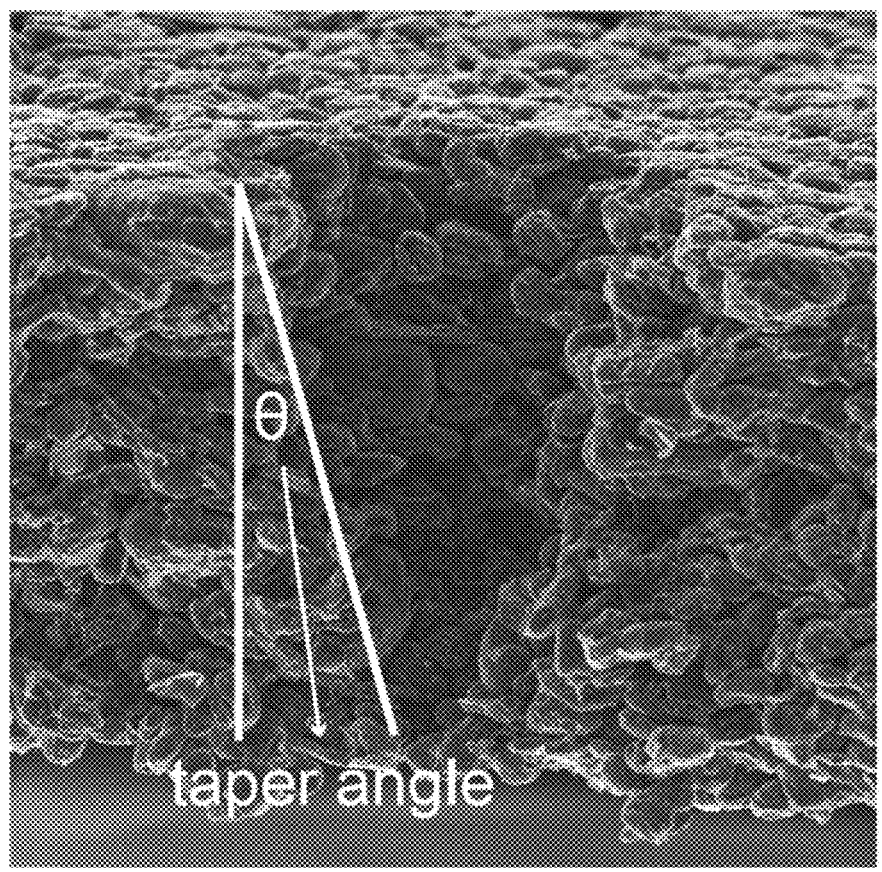
Figure 20:
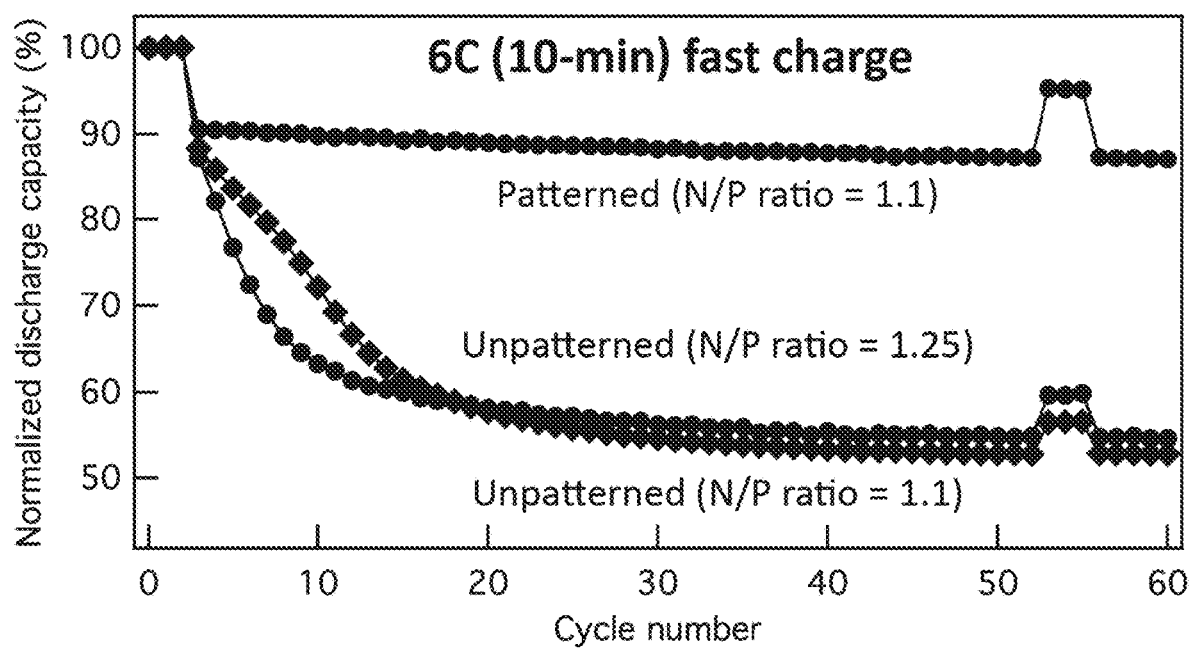

FIG. 17 is a plot of capacity retention versus cycle number for two Li-ion battery cells that were cycled at increasingly high C-rates, one of which included a patterned anode having laser-ablated vertical channels in accordance with one embodiment of the present disclosure and another of which lacked such channels and thus functioned as a control cell; and FIG. 18 is a plot of Coulombic efficiency versus cycle number for the same two Li-ion battery cells to which FIG. 17 relates;

FIG. 19 is an SEM image (cross-sectional view) of an anode shown that includes tapered vertical channels accordance with one embodiment of the present disclosure; and FIG. 20 is a plot of normalized discharge capacity versus cycle number that shows the capacity fade of three different cell configurations (a patterned electrode with 1.1 N/P ratio, an unpatterned electrode with 1.25 N/P ratio, and an unpatterned electrode with 1.1 N/P ratio) under 6 C fast-charge conditions.

DESCRIPTION

A 3-D anode or negative electrode for a Li-ion battery is disclosed that can improve the rate capability (i.e., can be charged at higher C-rates) of the battery while maintaining a high reversible capacity. The anode includes at least one carbonaceous electrochemically active lithium host material selected from the group consisting of graphite, hard carbon, or a blend of graphite and hard carbon. Other electrochemically active lithium host materials, such as lithium titanate and lithium niobate, may also be included in the anode to enhance the Li intercalation rate of the anode and support fast charging conditions. The anode further defines patterned channels with a tunable geometry to reduce electrolyte concentration gradients during cycling in an effort to solve the low accessible capacity and Li plating problems that tend to affect thicker anode structures. The anode may be used in conjunction with conventional cathode and electrolyte components of Li-ion batteries.

Figure 1:
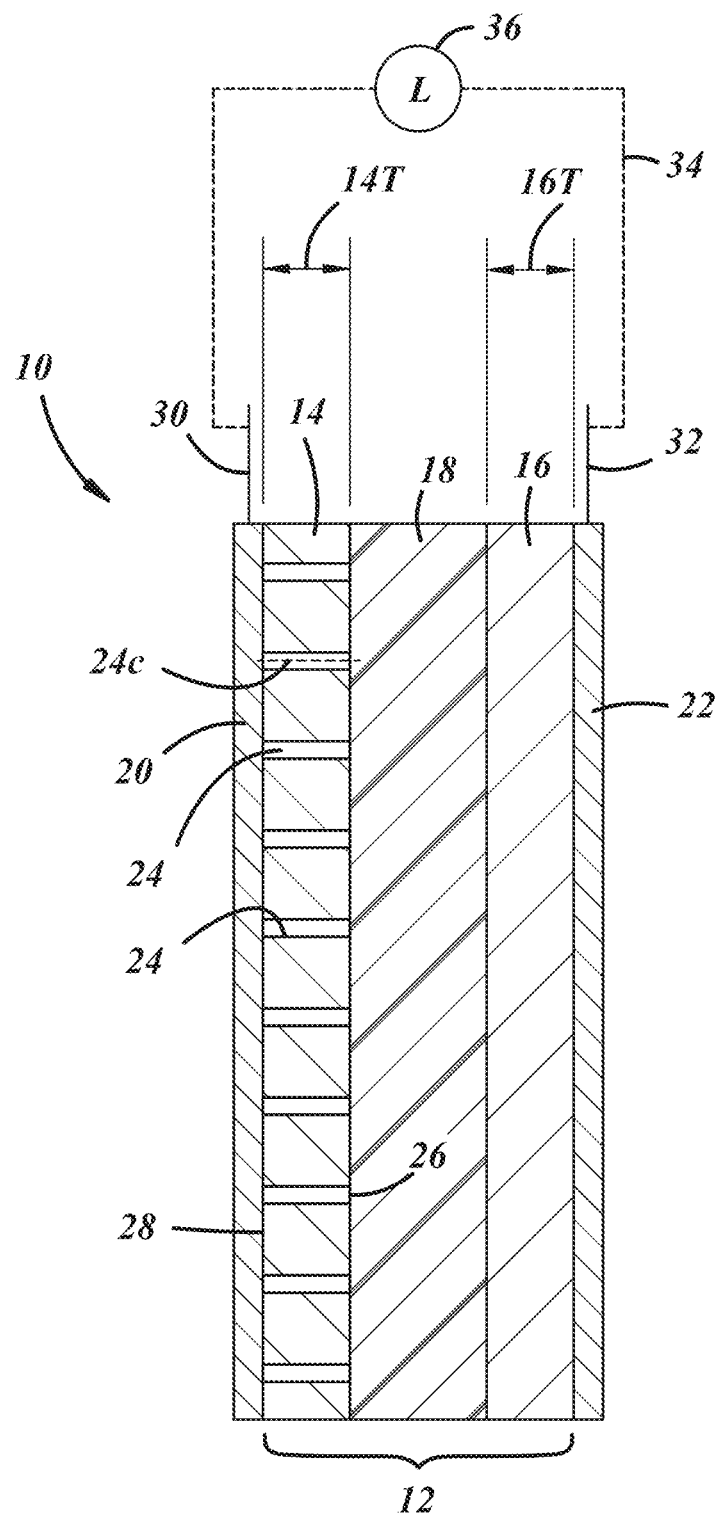
FIG. 1 is cross-sectional, schematic illustration of an electrochemical battery unit cell of a Li-ion battery in accordance with one embodiment of the present disclosure.

Referring now to FIG. 1, a Li-ion battery 10 that includes one or more electrochemical battery unit cells 12 is illustrated. Only a single unit cell 12 is shown here for purposes of simplicity, although it will be understood by those skilled in the art that additional unit cells 12 may be electrically connected to the unit cell 12 shown here to achieve certain specified capacity, power, and/or voltage characteristics for a prescribed battery application. The electrochemical battery unit cell 12 of the Li-ion battery 10 includes an anode 14 (during discharge), a cathode 16 (during discharge), and a separator 18 that physically separates and electrically isolates the anode 14 and the cathode 16 from each other. Additionally, the anode 14 is carried on an anode-side metal current collector 20, and the cathode is carried on a cathode-side metal current collector 22. Multiple electrochemical battery unit cells 12 may be stacked so that each anode-side current collector 20 is interposed between an anode 14 of one unit cell 12 and an anode 14 of an adjacent unit cell 12 and, similarly, each cathode-side current collector 22 is interposed between a cathode electrode 16 of one unit cell 12 and a cathode electrode 16 of an adjacent unit cell 12. While the anode 14 is shown here in a monopolar battery architecture, it should be noted that the anode 14 may also be used in other battery architectures include a bipolar battery architecture.

The anode 14 comprises at least one carbonaceous electrochemically active lithium host material selected from the group consisting of graphite, hard carbon or a blend of graphite and hard carbon. Other electrochemically active lithium host materials, such as lithium titanate and lithium niobate, may also be included in the anode 14, as mentioned above. The anode 14 may include graphite as the only carbonaceous electrochemically active lithium host material or, in other embodiments, the anode 14 may be a composite or hybrid anode that includes a blend of graphite and hard carbon. In addition to the electrically active lithium host materials, the anode 14 may be intermingled with a polymeric binder and, optionally, a conductive fine particle diluent. The polymeric binder material may be one or more of polyvinylidene fluoride (PVdF), an ethylene propylene diene monomer (EPDM) rubber, styrene butadiene rubber (SBR), a carboxymethyl cellulose (CMC), polyacrylic acid, or mixtures thereof. The conductive diluent may be particles of carbon black.

Graphite is a crystalline form of carbon having covalent hexagonal rings of carbon atoms arranged in layered horizontal sheets. Lithium ions can be inserted between these layers of sheets. In one particular embodiment, the graphite used in the anode 14 may have a purity of greater than 99%, and preferably greater that 99.5% or even 99.98%, and be comprised of graphite particles that exhibit an ellipsoidal shape and have a particle size distribution in which at least 90%, and preferably at least 95%, of the graphite particles have a particle size (measured at the greatest dimension of the particles) ranging from 5-25 μm or, more narrowly, ranging from 5-15 μm. These characteristics of the graphite along with the laser patterning of the anode 14, which is discussed below, can lead to improve anode and battery performance characteristics.

Hard carbon is a non-graphitizable carbonaceous material that exhibits a disordered molecular structure. Hard carbon is referred to as "non-graphitizable" because it cannot be transformed into graphite even when heat-treated at a temperature of 3000° C. (the temperature at which soft carbon can be transformed back into graphite). Hard carbon consists of randomly oriented small crystallites. Lithium ions can be inserted between the small crystallites as well as between the micro-pores surrounded by these crystallites in the hard carbon structure. One specific example of a hard carbon suitable for inclusion in the anode is petroleum coke. By blending graphite and hard carbon together, the anode 14 exhibits advantages of both materials—most notably, the high reversible capacity of graphite and the good rate capability of hard carbon. The amount ratio between blended materials may be tailored to attain an optimal composition that balances the tradeoff between capacity loss and rate performance. If a blend of graphite and hard carbon is included in the anode 14, the weight ratio of graphite to hard carbon may range from 20:80 to 80:20 or, more narrowly, it may range from 25:75 to 75:25.

The blend of graphite and hard carbon strikes a balance between energy density (graphite) and power performance (hard carbon) that may be desired in certain battery applications. Graphite, for example, exhibits stable electrochemical performance and high specific capacity. During charge/discharge processes, graphite displays well-defined voltage plateaus at low potentials (<0.2 V vs. Li/Li$^+$) as well as high first-cycle and subsequent cycling Coulombic efficiency. These properties make graphite an excellent option for an anode material when seeking to achieve high-energy-density Li-ion batteries. However, when graphite anodes are subjected to fast charging conditions, high applied currents induce large anode polarizations, thus reducing the accessible capacity of anodes. Moreover, regions of the anode can reach electrochemical potential values more negative than the thermodynamic potential of Li metal (<0 V vs. Li/Li$^+$), making Li plating a favorable process. The formation of Li dendrites on graphite anode \ has been shown to cause irreversible loss of Li inventory, leading to significant cell capacity fade and safety concerns. Hard carbon, on the other hand, displays improved fast-charging capability when used as the anode material for Li-ion batteries due to its unique sloping charge/discharge voltage profile between 0-1.2 V (vs. Li/Li$^+$) and fast solid-state lithium diffusivity. However, hard carbon exhibits low first-cycle Coulombic efficiencies (<80%) due to irreversible Li loss, significantly reducing the energy density. By blending two materials that have these energy density and power performance tradeoffs, improved electrochemical performance may be achieved by coordinating the mixing ratio between graphite and hard carbon as specified above.

The anode 14 may also be structurally modified to improve the fast charging capability of the cell 12 and, in turn, the Li-ion battery 10. In particular, the anode 14 defines a plurality of vertical channels 24 that extend at least partially through a thickness 14T of the anode 14 from a first major face 26 that lies adjacent to the separator 18 towards a second major face 28 that lies adjacent to the anode-side metal current collector 20 in the embodiment shown in FIG. 1. The at least one carbonaceous electrochemically active lithium host material is distributed throughout the bulk of the anode 14 between the first and second major faces 26, 28. The vertical channels 24 are open, non-tortuous columns that extend longitudinally along a centerline 24c, and they are open at least at the first major face 26 that confronts the separator 18. In one embodiment, the plurality of vertical channels 24 extend entirely through the thickness 14T of the anode 14 and are thus open at the first and second major faces 26, 28. The array of vertical channels 24 serve as linear pathways for rapid ionic diffusion through the thickness 14T of the anode 14, which allows for a more homogeneous flux of Li ions throughout the volume of the anode 14, improve through-plane transport, and decreased ionic concentration gradients in comparison to the slow diffusion paths in conventional anode structures. As such, the vertical channels 24 can help improve the accessible capacity of the anode 14 during fast charging of the Li-ion battery 10 while lowering the propensity for Li plating on the anode 14.

The plurality of vertical channels 24 may be formed in the anode 14 by laser ablation following consolidation of the anode 14, which often occurs in a calendering operation, although other techniques for forming the vertical channels 24 are certainly possible. By designing and tuning the pore diameter, spacing, and orientation of the vertical channels 24, the channel geometry distributed throughout the anode 14 can be determined and optimized to achieve optimal cycling performance of the Li-ion battery 10. For example, in one embodiment, the diameter of each of the vertical channels 26 (as measured in the largest dimension) may range from 5 μm to 100 μm, or more narrowly from 5 μm to 50 μm, and the spacing between the channels 26 as measured between channel centerlines 24c may range from 10 μm to 200 μm (that is, each of the vertical channels 24 is spaced apart from another vertical channel by a distance of 10 μm to 200 μm as measured between centerlines 24c of the vertical channels). Following formation of the vertical channels 24, the first major face 26, which may be disposed adjacent to the separator 18 in the Li-ion battery 10, may be modified with atomic layer deposition (ALD), chemical vapor deposition (CVD), or solution coating to reduce capacity fade during fast charging of the Li-ion battery 10 as well as irreversible capacity loss.

The carbonaceous electrochemically active lithium host material(s) included in the anode 14 and the patterning of vertical channels 24 with the anode 14 can improve the performance of the anode 14 by improving rate capability without detrimentally sacrificing reversible capacity. When the graphite described above (purity of greater than 99% and graphite particles that exhibit an ellipsoidal shape with a particle size ranging from 5-15 µm) is included in the anode 14, for example, the laser ablation process is more apt to form clean and well-defined vertical channels 24 that typically do not produce more than a negligible amount of debris and residual particles. This is because morphology of the graphite particles, specifically the ellipsoidal shape and tight particle size distribution, leads to sublimation of entire graphite particles during laser impingement rather than cutting through particles. The parameters of the laser (laser power, wavelength, repetition rate, pulse duration, number of pulses) can also be tuned to help in this regard. The formation of the vertical channels 24 that are largely free of debris and residual particles can improve the overall electrochemical performance of the anode 14 and the battery 10 by avoiding pore clogging as well as cracking or other forms of mechanical damage to the anode 14.

The ability to form well-defined and unclogged vertical channels 24 through the bulk thickness 14T of the anode 14 allows for precision tuning of the density and dimensions of the channels 24. As shown in FIG. 19, for example, one or more of the vertical channels 24 may be tapered inward towards the second major face 28 of the anode 14 such that a cross-sectional area of the channel 24 increases in a direction toward the first major face 26 of the anode 14, which in the Li-ion battery 10 shown in FIG. 1 is the face that confronts the separator 18. The slope of the taper can be defined by a channel taper angle $\theta$; that is, the angle of the slope of the vertical channel 24 relative to the centerline 24c of the channel 24. The channel taper angle $\theta$ of the vertical channel(s) 24 can be controlled to between 0.5 to 20 degrees by tuning laser parameters and optics alignment. The taper angle $\theta$ can be rationally tuned to optimize the fast-charging performance of the anode 14. Specifically, the taper angle of a vertical channel 24 directly affects the amount of through-plane ionic current flowing through the channel 24. A slight taper angle between 0 to 20 degrees can alleviate the ionic current near the separator 18 in the Li-ion battery 10 to a larger cross-sectional area and thus reduces the local current density flowing through the channel 24, thereby improving fast-charging performance.

The arrayed pattering of the vertical channels 24 throughout the anode 14 allows for thinner N/P ratios in the Li-ion battery 10 shown in FIG. 1 as well as other types. The N/P ratio is the ratio between the thickness 14T of the anode 14 and a thickness 16T of the cathode 16. Typically, an N/P ratio of between 1.1 and 1.3 is used to help avoid overcharge and Li plating of the anode 14. For instance, during fast charging of unpatterned anodes, Li plating of the anodes becomes thermodynamically favorable due to the inhomogeneous concentration gradients that are formed. The formation of Li plating is highly irreversible and thus results in significant capacity fade and the eventual failure of the cell. The arrayed patterning of the anode 14 counters these problems by improving Li-ion transport during fast charging, which helps avoid Li plating, and also creates a more homogeneous concentration throughout the anode volume. As a result, a lower N/P ratio of less than 1.1 is possible, which can further improve the overall battery energy density. This is demonstrated in FIG. 20 where the capacity fade of three different cell configurations under 6 C fast-charge conditions is plotted. The three cell configurations included (1) a patterned anode with 1.1 N/P ratio, (2) an unpatterned anode with 1.25 N/P ratio, and (3) an unpatterned electrode with 1.1 N/P ratio. As shown, a similar trend in capacity fade is observed between the unpatterned anode with 1.1 and 1.25 N/P ratios. However, with the patterned anode, the N/P ratio could be reduced to 1.1 while the capacity retention can be significantly improved at the same time.

The arrayed patterning of the of vertical channels 24 throughout the anode 14 also enables good rate capability or fast charging of thicker anodes, especially when combined with a blend of graphite and hard carbon as the carbonaceous electrochemically active lithium host material in the anode 14. The arrayed patterning of the vertical channels 24 throughout the anode 14 and fully or partially across the thickness 14T of the anode 14 creates diffusion paths for rapid ionic transport, thus leading to more homogeneous Li-ion concentration and electrochemical reaction rates throughout the anode volume. And, when the anode 14 includes a blend of graphite and hard carbon, the blend contributes to the improved fast charging performance due to the unique characteristics of hard carbon—notably, its higher solid-state lithium diffusivity and variation in voltage profile—compared to graphite. In that regard, the hard carbon in the anode 14 can help homogenize electrochemical reaction rates throughout the volume and reduce the driving force for battery degradation. As a result of the patterned array of vertical channels 24, preferably in combination with a blend of graphite and hard carbon in the anode 14, fast charging at 4 C to 6 C is possible with the thickness 14T of the anode 14 reaching as high as 150 µm (>4.3 mAh/cm$^2$ anode loading). The thickness 14T of the anode 14 may thus range from 25 µm to 150 µm, or, more narrowly from 50 µm to 150 µm or even from 75 µm to 150 µm or from 100 µm to 150 µm.

The cathode 16 comprises a lithium-based active material that stores intercalated lithium at a higher electrochemical potential (relative to a common reference electrode) than the electrochemically active lithium host material(s) employed in the anode 14. The same polymeric binder materials (PVdF, EPDM, SBR, CMC, polyacrylic acid) and conductive fine particle diluent (carbon black) that may be used to construct the anode 14 may also be included in the cathode 16 for the same purposes. The lithium-based active material present in the cathode 16 may be one or more of a lithium nickel cobalt aluminum oxide (e.g., LiNi$_{0.8}$Co$_{0.15}$Al$_{0.05}$O$_2$ or NCA), lithium cobalt oxide (LiCoO$_2$), spinel lithium manganese oxide (LiMn$_2$O$_4$), nickel-manganese-cobalt oxide [Li(Ni$_X$Mn$_Y$Co$_Z$)O$_2$], lithium iron phosphate (LiFePO$_4$), or lithium fluorophosphate (Li$_2$FePO$_4$F). Some other suitable lithium-based active materials that may be employed as the lithium-based active material include lithium nickel oxide (LiNiO$_2$), lithium aluminum manganese oxide (Li$_X$Al$_Y$Mn$_{1-Y}$O$_2$), and lithium vanadium oxide (LiV$_2$O$_5$), to name but a few alternatives. Mixtures that include two or more of the above-recited lithium-based active materials may also be used. And, similar to the anode 14, the cathode 16 may include a patterned array of vertical channels having the same characteristics described above for the anode 14.

The separator 18 is an electrically-insulating medium that electrically insulates and physically separates the anode 14 and the cathode 16 while permitting Li-ions to pass between the anode 14 and the cathode 16 with the aid of an electrolyte. In one embodiment, the separator 18 comprises one or more porous polymer layers that, individually, may be composed of any of a wide variety of polymers. Each of the one or more polymer layers may be a polyolefin. Some specific examples of a polyolefin are polyethylene (PE) (along with variations such as HDPE, LDPE, LLDPE, and UHMWPE), polypropylene (PP), or a blend of PE and PP. In this case, the separator 18 may further be infiltrated with a liquid electrolyte throughout the porosity of the polymer layer(s) as well as the porosity of the anode 14 and the cathode 16. The liquid electrolyte preferably includes a lithium salt dissolved in a non-aqueous solvent. The lithium salt may be $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, or a mixture that includes two or more of these salts, and the non-aqueous solvent may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes two or more of these solvents.

Other variations of the separator 18 that are able to satisfy the functional requirements of physically separating the anode 14 and the cathode 16, electrically insulating the anode 14 and the cathode 16 to prevent a short-circuit, and facilitating Li-ion mobility between the two electrodes 14, 16 may also be employed in the electrochemical battery cell 12. For example, in other embodiments, the separator 18 may be a solid or gel polymer electrolyte that includes a polymer layer—such as polyethylene oxide (PEO), polypropylene oxide (PPO), polyacrylonitrile (PAN), or polyvinylidene fluoride (PVdF)—that is complexed with a lithium salt or swollen with a lithium salt solution. The separator 18 may also be a solid-state separator that is formed of a glass or glass-ceramic composition that is modified with Li-ion conductive glass modifiers such as $Li_2S$ and $LiO_2$.

The anode-side and the cathode-side metal current collectors 20, 22 may be thin metallic foils that contact their respective electrodes 14, 16 over an appreciable interfacial surface area. The purpose of these metal current collectors 20, 22 is to exchange free electrons with their respective electrodes 14, 16 during discharging and charging of the Li-ion battery 10. To facilitate the collective distribution and flow of electrons, the anode-side metal current collector 20 includes an anode connection tab 30, and the cathode-side metal current collector 22 includes a cathode connection tab 32. The connection tabs 30, 32 protrude away from their respective electrodes 14, 16 and are used to electrically connect the anode 14 and the cathode 16 to an external circuit 34 that directs current flow through an external load 36 during battery discharge. Conventionally, the anode-side metal current collector 20 is a copper foil and the cathode-side metal current collector 22 is an aluminum foil.

The Li-ion battery 10 operates during discharge by spontaneously releasing intercalated lithium from the anode 14 to produce Li-ions and free electrons. The electrons are collected by the anode-side metal current collector 20 and are routed through the external load 36 via the external circuit 34 and are eventually delivered to the cathode-side current collector 22. At the same time, the Li-ions released at the anode 14 migrate through the separator 18 and into the cathode 16 where they accept available free electrons and become stored in the cathode 16 as intercalated lithium. This electrochemical process is reversed during charging of the battery 10 when the battery 10 is connected to a power source that applies a suitable voltage. The Li-ion battery 10 disclosed herein exhibits an enhanced fast charging capability due to the 3-D composite structure of the anode 14 while maintaining a high capacity. The Li-ion battery 10 can handle fast charge rates of 4 C and above. In some applications, the Li-ion battery 10 can be charged to drive lithium out of the cathode 16 and into the anode 14 at a C-rate of at least 2 C, and preferably at a C-rate of between 4 C to 6 C, with an anode loading that in some instances may be greater than 4 $mAh/cm^2$ anode, preferably if the anode 14 includes the patterned array of vertical channels 24 in combination with graphite and hard carbon being present in the anode 14 as described above.

EXAMPLES

Figure 2:
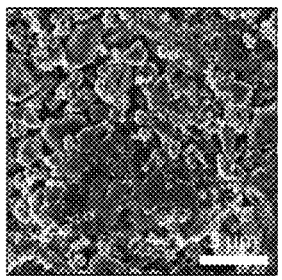
FIG. 2 is an SEM image (top-down view) of an anode that includes a 75:25 weight ratio of graphite:hard carbon in accordance with one embodiment of the present disclosure.
Figure 3:
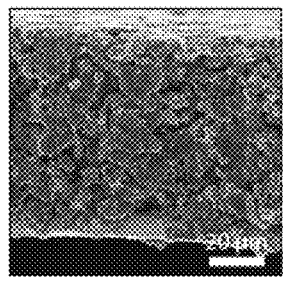
FIG. 3 is an SEM image (cross-sectional view) of the anode shown in FIG. 2 that includes a 75:25 weight ratio of graphite:hard carbon in accordance with one embodiment of the present disclosure.
Figure 4:
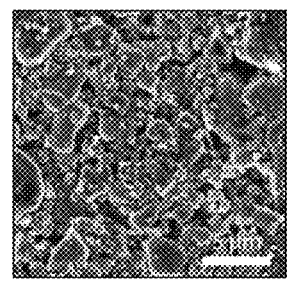
FIG. 4 is an SEM image (top-down view) of an anode that includes a 50:50 weight ratio of graphite:hard carbon in accordance with one embodiment of the present disclosure.
Figure 5:
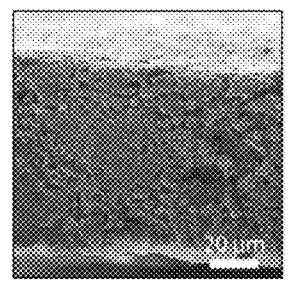
FIG. 5 is an SEM image (cross-sectional view) of the anode shown in FIG. 4 that includes a 50:50 weight ratio of graphite:hard carbon in accordance with one embodiment of the present disclosure.
Figure 6:
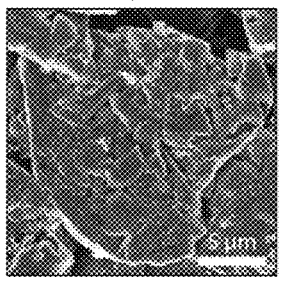
FIG. 6 is an SEM image (top-down view) of an anode that includes graphite (with no hard carbon) for purposes of comparison with the SEM images of FIGS. 2 and 4.
Figure 7:
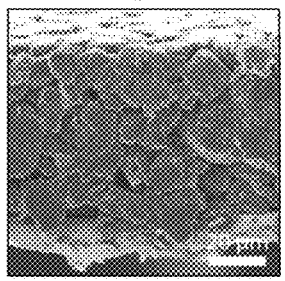
FIG. 7 is an SEM image (cross-sectional view) of the anode shown in FIG. 6 for purposes of comparison with the SEM images of FIGS. 3 and 5.
Figure 8:
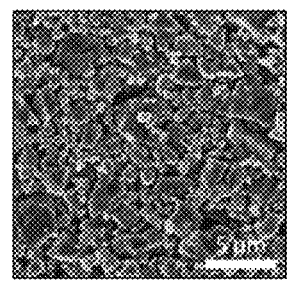
FIG. 8 is an SEM image (top-down view) of an anode that includes hard carbon (with no graphite) for purposes of comparison with the SEM images of FIGS. 2 and 4.
Figure 9:
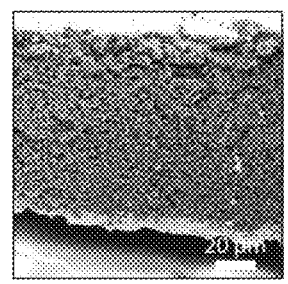
FIG. 9 is an SEM image (cross-sectional view) of the anode shown in FIG. 8 for purposes of comparison with the SEM images of FIGS. 3 and 5.

In a first example, composite anodes were fabricated. Here, graphite and hard carbon powders were first mixed together along with conductive additives and binder materials to make an anode slurry. The slurry was then casted onto a current collector and calendared to a targeted porosity. FIGS. 2-3 show the SEM images of a composite anode that includes a 75:25 weight ratio of graphite:hard carbon, and FIGS. 4-5 show the SEM images of a composite anode that includes a 50:50 weight ratio of graphite:hard carbon. FIGS. 2 and 4 are top-down views of the composite anodes while FIGS. 3 and 5 are cross-sectional views. A well-mixed morphology and uniform distribution of both materials can be observed along the electrode thickness. FIGS. 6-7 and 8-9 are similar views of graphite and hard carbon, respectively, for purposes of comparison.

Figure 10:
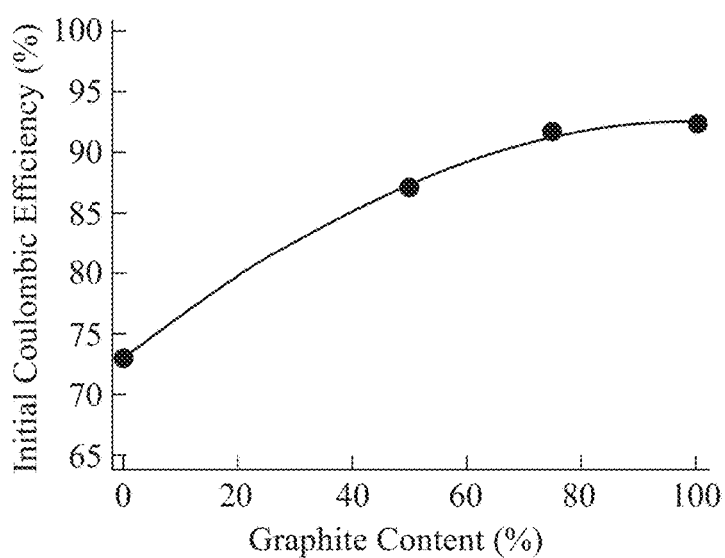
FIG. 10 is a plot of initial Coulombic efficiency versus graphite content in the anode for several anode examples including two of which were anodes that contained a blend of graphite and hard carbon in accordance with one embodiment of the present disclosure.

The graphite, hard carbon, and composite anodes were then coupled with NCA (lithium nickel cobalt aluminum oxide material) cathodes to make full cells. 1M $LiPF_6$ in EC:EMC based solvent was used as a liquid electrolyte. The cells were cycled at varying charge rates (C rate of C/10 to 4 C) to quantify the initial capacity loss during formation cycles and rate capability during fast charging. FIG. 10 shows initial Coulombic efficiency of the cells during the first formation cycle. The graphite cell displayed the highest reversibility of 93% and the hard carbon cell showed the lowest value of 73%. The Gr/HC 75/25 and 50/50 cells showed intermediate efficiency values of 92% and 87%, respectively. On the other hand, the rate performance of the cells shows an opposite trend when charged at a high C-rate of 4 C. As shown in FIG. 11, the accessible capacity is higher with more hard carbon content in the composite anodes. To achieve cells with both high reversible capacity and good rate capability, these two factors are thus multiplied together to evaluate the overall capacity retention at 4 C. It is shown in FIG. 12 that by carefully choosing the materials and tuning the amount ratios, an optimal point can be obtained at for a given anode loading, porosity, and charge rate.

In a second example, composite anode structures that included a patterned architecture of vertically-oriented channels were prepared. A high-power laser ablation platform was first designed and constructed, including laser head installation, optics design, and stage design for battery electrodes. During the ablation process, several pulses of laser strike the sample anode surface and remove the anode materials until a targeted channel depth was reached. By programming the laser and optics setting parameters, varying channel pore diameters and spacings can be achieved. FIGS. 13-16 show the SEM images of the patterned electrodes after the laser ablation process.

To demonstrate the improved rate capability of the patterned anodes compared to the conventional electrodes, full cells were assembled with ~5.5 mAh/cm² anodes and ~5 mAh/cm² NCA cathodes. One of the cells includes a patterned anode having laser-ablated vertical channels and another cell (the control cell) did not. The cells were then cycled at increasingly high C-rates (1 C to 6 C) after formation cycles to quantify the capacity retention at high charging rates. The channel pore diameter and spacing of the vertical channels formed in the patterned anode were 35 μm and 100 μm, respectively.

FIG. 17 shows the capacity retention vs. cycle number plot. While both anodes showed similar capacity retention at 1 C and 2 C, the effect of laser modifications can be observed upon 3 C fast charging. Irreversible capacity loss can be observed for the control cell at 3 C to 6 C, indicating the onset of Li plating. As a result, a capacity loss of 18.4% was obtained after the rate test. On the other hand, the patterned cell exhibited a much more stable cycling at fast charging rates, resulting in only 7.2% capacity fade. FIG. 18 further shows the Coulombic efficiency plot. Upon 4 C to 6 C fast charging, the control cell showed reduced efficiency values (<99%), whereas the patterned cell shows a much higher Coulombic efficiency of 99.8%.

It is to be understood that the foregoing description is of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A lithium-ion battery, comprising:
an anode comprising an electrochemically active lithium host material;
a cathode comprising a lithium-based active material that stores intercalated lithium at a higher electrochemical potential than the electrochemically active lithium host material of the anode; and
a separator that physically separates and electrically isolates the anode and the cathode from each other and allows lithium ions to pass between the anode and the cathode in the presence of an electrolyte,
wherein the anode includes a first major face and a second major face, the first and second major faces defining a thickness of the anode,
wherein the electrochemically active lithium host material comprises graphite and at least one other electrochemically active lithium host material and is distributed between the first and second major faces of the anode, the graphite having graphite particles that exhibit an ellipsoidal shape,
wherein the anode defines a plurality of channels extending at least partially through the thickness of the anode, and
wherein a width of each of the channels is in a range from 5 μm to 100 μm.

2. The battery of claim 1, wherein each electrochemically active lithium host material is carbonaceous.

3. The battery of claim 1, wherein the electrochemically active lithium host material includes graphite or hard carbon in a range from 20 wt % to 80 wt %.

4. The battery of claim 1, wherein the graphite has a purity of 99% or greater and the graphite particles have a particle size distribution in which at least 90% of the graphite particles have a particle size ranging from 5-25 μm.

5. The battery of claim 1, wherein each channel is spaced apart from another channel by a distance in a range from 10 μm to 200 μm as measured between centerlines of the channels.

6. The battery of claim 1, wherein the first major face confronts the separator and at least one of the channels tapers inward toward the second major face of the anode.

7. The battery of claim 1, wherein the first major face confronts the separator and each channel is open at the first major face.

8. The battery of claim 1, wherein the plurality of channels is laser-patterned.

9. The battery of claim 1, wherein the electrochemically active lithium host material comprises graphite and only one other electrochemically active lithium host material.

10. The battery of claim 1, wherein the battery has a charge capacity retention greater than 92.8% after five charge cycles at a 4 C, 5 C, or 6 C charge rate.

11. The battery of claim 1, wherein the battery has a charge capacity retention greater than 92.8% after fifteen charge cycles including five charge cycles each at 4 C, 5 C, and 6 C charge rates.

12. The battery of claim 1, wherein the battery maintains a Coulombic efficiency greater than 99% through five charge cycles at a 3 C, 4 C, 5 C, or 6 C charge rate.

13. The battery of claim 1, wherein the battery maintains a Coulombic efficiency greater than 99% through twenty charge cycles including five charge cycles each at 3 C, 4 C, 5 C, and 6 C charge rates.

14. The battery of claim 1, wherein the battery has a normalized discharge capacity greater than 85% through fifty charge cycles at a 6 C charge rate.

* * * * *